(12) United States Patent
Cao

(10) Patent No.: US 10,113,592 B2
(45) Date of Patent: Oct. 30, 2018

(54) ROLLER BEARING MODULE, A METHOD FOR MANUFACTURING A ROLLER BEARING MODULE, AND A METHOD FOR FORMING A VEHICLE HUB ASSEMBLY

(71) Applicant: Aktiebolaget SKF, Gothenburg (SE)

(72) Inventor: JiaJie Cao, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/632,771

(22) Filed: Jun. 26, 2017

(65) Prior Publication Data
US 2017/0370416 A1 Dec. 28, 2017

(30) Foreign Application Priority Data

Jun. 28, 2016 (DE) .................. 10 2016 211 634

(51) Int. Cl.
| | |
|---|---|
| *F16C 33/78* | (2006.01) |
| *B60B 27/02* | (2006.01) |
| *F16C 19/54* | (2006.01) |
| *F16C 43/04* | (2006.01) |
| *B60B 27/00* | (2006.01) |
| *F16C 33/66* | (2006.01) |
| *F16C 41/04* | (2006.01) |
| *F16C 19/36* | (2006.01) |

(52) U.S. Cl.
CPC ........ *F16C 33/7813* (2013.01); *B60B 27/001* (2013.01); *B60B 27/02* (2013.01); *F16C 19/364* (2013.01); *F16C 19/548* (2013.01); *F16C 33/6677* (2013.01); *F16C 33/784* (2013.01); *F16C 33/7876* (2013.01); *F16C 41/04* (2013.01); *F16C 43/04* (2013.01); *F16C 2326/02* (2013.01)

(58) Field of Classification Search
CPC ...... F16C 19/28; F16C 19/548; F16C 19/546; F16C 33/7813; F16C 33/785; F16C 35/063; F16C 43/04; F16C 2226/74; F16C 2326/02; B23Q 1/28; Y10T 29/49682; Y10T 29/49696; B60B 27/001; B60B 27/02; B60B 27/0073
USPC ....... 384/477, 507, 510, 513, 517, 544, 551, 384/563, 589; 29/898.1, 898.06
See application file for complete search history.

(56) References Cited

U.S. PATENT DOCUMENTS

| | | | | |
|---|---|---|---|---|
| 2,631,072 | A | * | 3/1953 | Montgomery ........ F16C 19/548 384/563 |
| 3,977,741 | A | * | 8/1976 | Lundberg .............. B60B 27/001 295/42.1 |
| 4,798,482 | A | * | 1/1989 | Kruk ..................... F16C 19/385 384/559 |

(Continued)

*Primary Examiner* — Marcus Charles
(74) *Attorney, Agent, or Firm* — Bryan Peckjian; SKF USA Inc. Patent Dept.

(57) ABSTRACT

A roller bearing module for a vehicle hub module having an outboard roller bearing and an inboard roller bearing. The roller bearing module provides a spacer coupling the outboard roller bearing to the inboard roller bearing. The spacer is arranged in an axial direction between the outboard roller bearing and the inboard roller bearing. The roller bearing module includes a first sealing structure arranged at an outwards facing side of the outboard roller bearing. The roller bearing module further includes a second sealing structure arranged at an inwards facing side of the inboard roller bearing.

10 Claims, 9 Drawing Sheets

(56) References Cited

U.S. PATENT DOCUMENTS

| | | | | |
|---|---|---|---|---|
| 5,482,381 | A * | 1/1996 | Krum | F16C 33/76 |
| | | | | 360/265.3 |
| 5,484,213 | A * | 1/1996 | Caillaut | B60C 23/003 |
| | | | | 152/417 |
| 5,492,419 | A * | 2/1996 | Miller | F16C 19/386 |
| | | | | 384/477 |
| 5,642,946 | A * | 7/1997 | Caillault | B60C 23/003 |
| | | | | 384/477 |
| 6,149,244 | A * | 11/2000 | Wagner | B60B 27/001 |
| | | | | 29/898.07 |
| 6,457,869 | B1 * | 10/2002 | Smith | B60B 27/001 |
| | | | | 384/448 |
| 7,086,784 | B2 * | 8/2006 | Ruetter | B60C 23/003 |
| | | | | 152/417 |
| 7,341,379 | B2 * | 3/2008 | Koyama | G11B 5/4813 |
| | | | | 384/477 |
| 7,618,195 | B2 * | 11/2009 | Dagh | F16C 19/364 |
| | | | | 277/345 |
| 8,356,946 | B2 * | 1/2013 | Schaefer | B60B 27/001 |
| | | | | 384/477 |
| 8,708,426 | B2 * | 4/2014 | Ruedi | B60B 27/001 |
| | | | | 301/105.1 |
| 9,061,545 | B2 * | 6/2015 | Horn | B60B 27/001 |
| 9,222,517 | B1 * | 12/2015 | King | F16C 35/063 |
| 9,273,729 | B2 * | 3/2016 | Pottebaum | F16C 33/6659 |
| 2003/0094849 | A1 * | 5/2003 | Joki | B60B 27/001 |
| | | | | 301/105.1 |
| 2010/0320832 | A1 * | 12/2010 | Weigand | B60B 27/001 |
| | | | | 301/110 |

* cited by examiner

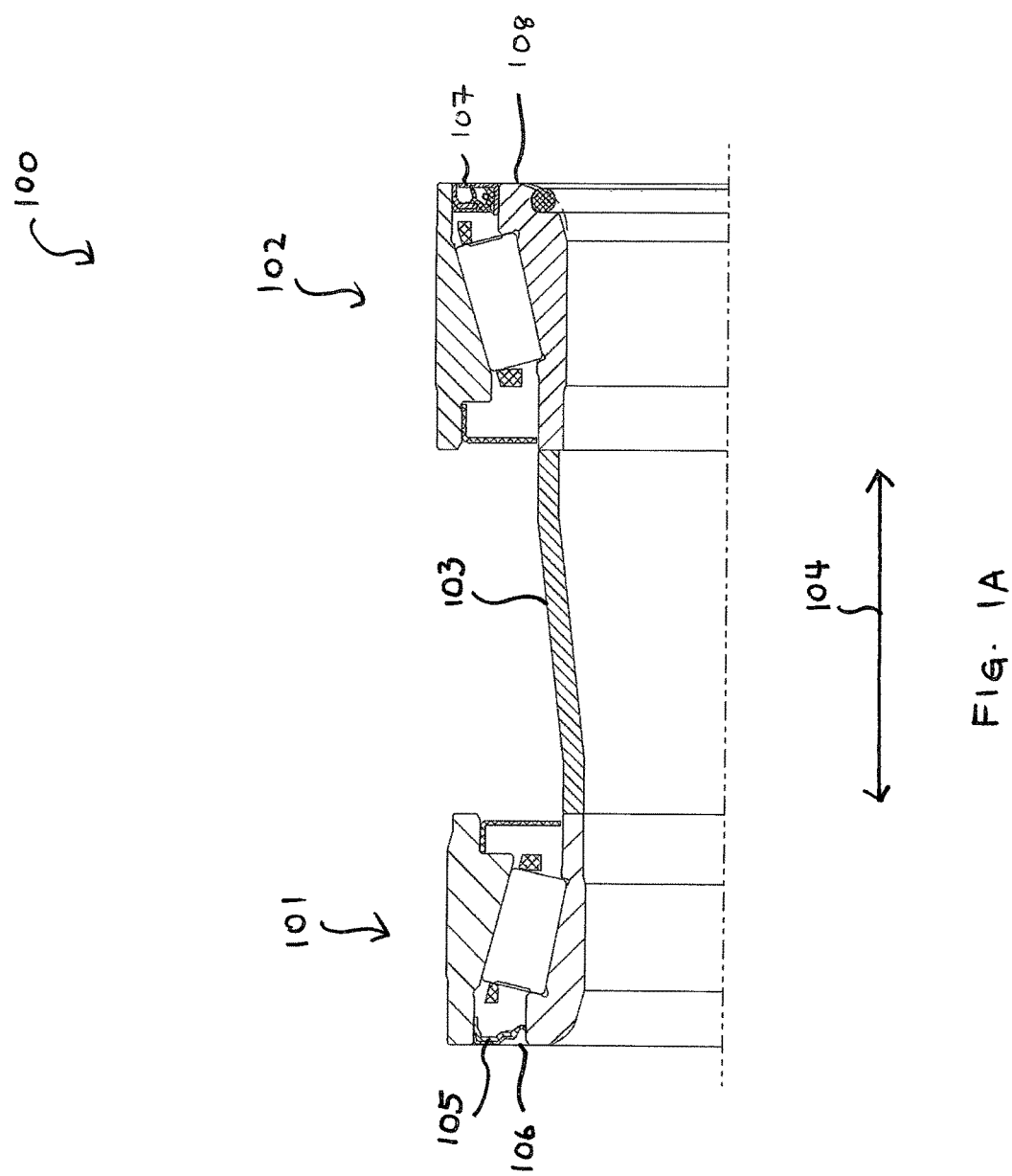

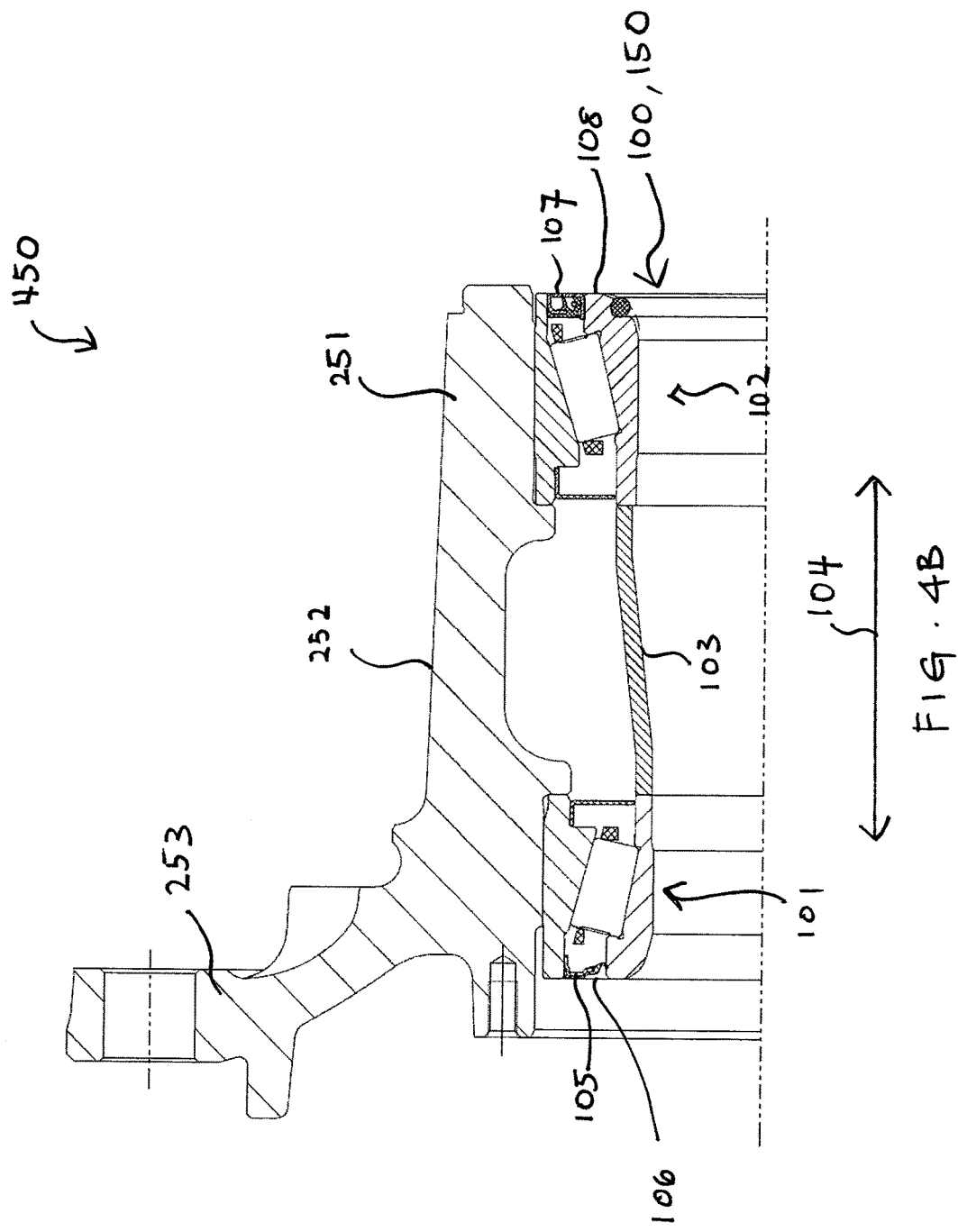

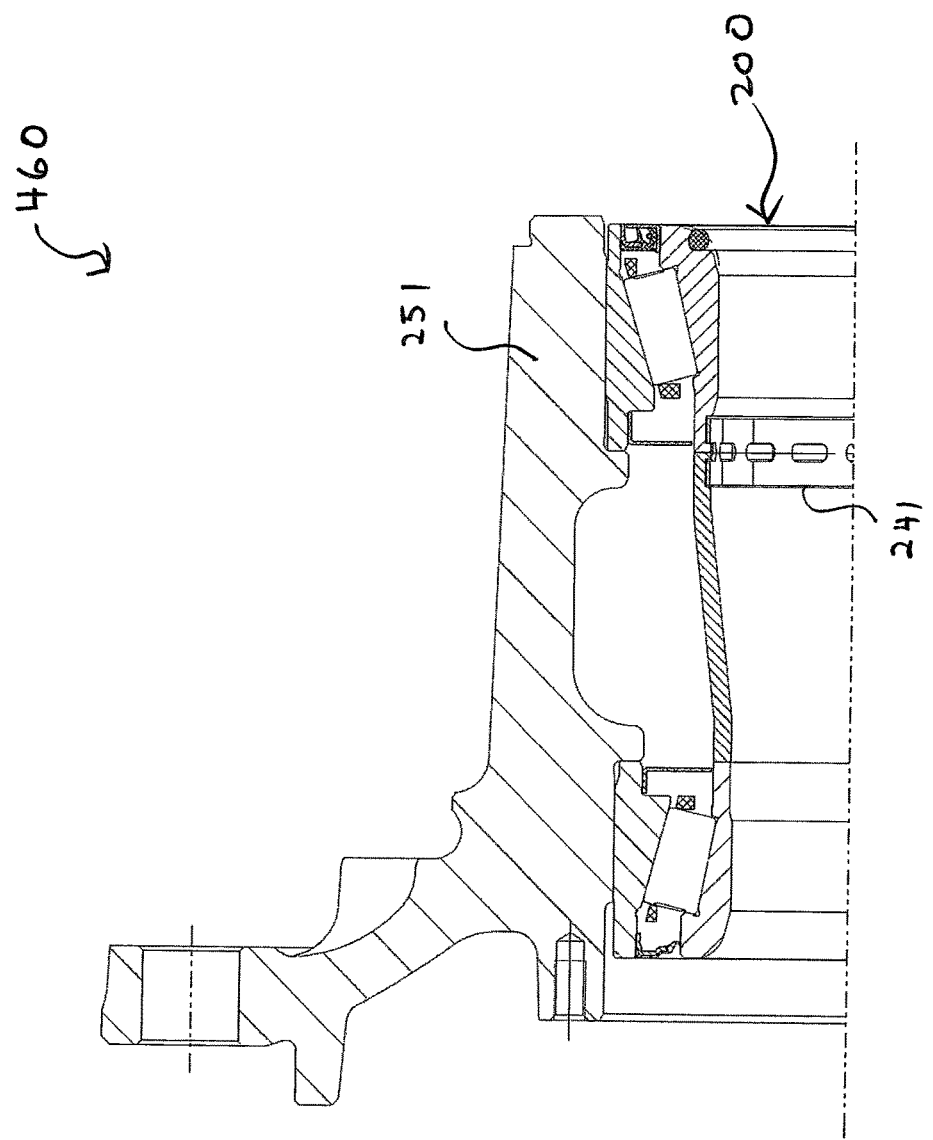

ROLLER BEARING MODULE, A METHOD FOR MANUFACTURING A ROLLER BEARING MODULE, AND A METHOD FOR FORMING A VEHICLE HUB ASSEMBLY

CROSS REFERENCE TO RELATED APPLICATIONS

This application claims priority to German patent application no. 102016211634.7 filed on Jun. 28, 2016, the contents of which are fully incorporated herein by reference.

FIELD OF THE INVENTION

Embodiments relate to measures for improving loading rates of a vehicle hub module and/or for reducing complexity in the manufacturing of roller bearing modules and/or vehicle hub assemblies. Embodiments relate in particular to a roller bearing module, a method for manufacturing a roller bearing module, and a method for forming a vehicle hub assembly.

BACKGROUND OF THE INVENTION

Vehicle hub units (e.g. truck hub units) cannot be designed very widely due to manufacturing constraints. For example, an outboard roller set for an outboard roller bearing may be arranged very closely to an inboard roller set for an inboard roller bearing. Due to the inboard roller set and the outboard roller set being designed of the same size, and very closely to each other, the outboard roller bearing (outboard row bearing) may need to be designed to be very large, which may increase overall bearing cost. Furthermore, due to the vehicle hub unit (e.g. a truck hub unit) having the same roller set design for the inboard row of inboard roller bearings and the outboard row of outboard roller bearings, one row (e.g. the inboard roller bearing) may be fully loaded, whereas the other row (e.g. the outboard roller bearing) is not fully loaded (e.g. it is not used to 100% of its loading rate). DE102006017162A1 describes a roller bearing system having structurally identical tapered roller bearings. U.S. Pat. No. 6,149,244 describes a pre-set bearing system which is not a closed system and which may have reliability issues.

BRIEF SUMMARY OF THE INVENTION

It is a demand to provide vehicle hub modules and/or roller bearing modules with improved loading rate and/or reduced manufacturing complexity.

Such a demand may be satisfied by the subject matter of the claims.

Some embodiments relate to a roller bearing module for a vehicle hub module. The roller bearing module comprises an outboard roller bearing and an inboard roller bearing. The roller bearing module further comprises a spacer coupling the outboard roller bearing to the inboard roller bearing. The spacer is arranged in an axial direction between the outboard roller bearing and the inboard roller bearing. The roller bearing module further comprises a first sealing structure arranged at an outwards facing side of the outboard roller bearing. The roller bearing module further comprises a second sealing structure arranged at an inwards facing side of the inboard roller bearing.

Some embodiments relate to a method for manufacturing a roller bearing module. The method comprises coupling a first sealing structure to an outboard roller bearing and a second sealing structure to an inboard roller bearing to form a roller bearing module.

Some embodiments relate to a method for forming a vehicle hub assembly. The method comprises mounting a roller bearing module and at least one sealing structure of the roller bearing module onto a vehicle hub module in a single mounting step.

BRIEF DESCRIPTION OF THE SEVERAL VIEWS OF THE DRAWING

Some embodiments of apparatuses and/or methods will be described in the following by way of example only, and with reference to the accompanying figures, in which FIG. 1A shows a schematic cross section of a roller bearing module having an outboard roller bearing, an inboard roller bearing, a spacer, a first sealing structure and a second sealing structure;

FIG. 4B shows a schematic cross section of a vehicle hub assembly in which a roller bearing module is mounted onto a vehicle hub module;

FIG. 4C shows a schematic cross section of a vehicle hub assembly in which a roller bearing module having a clipping device is mounted onto a vehicle hub module.

DETAILED DESCRIPTION OF THE INVENTION

Figure 1B:
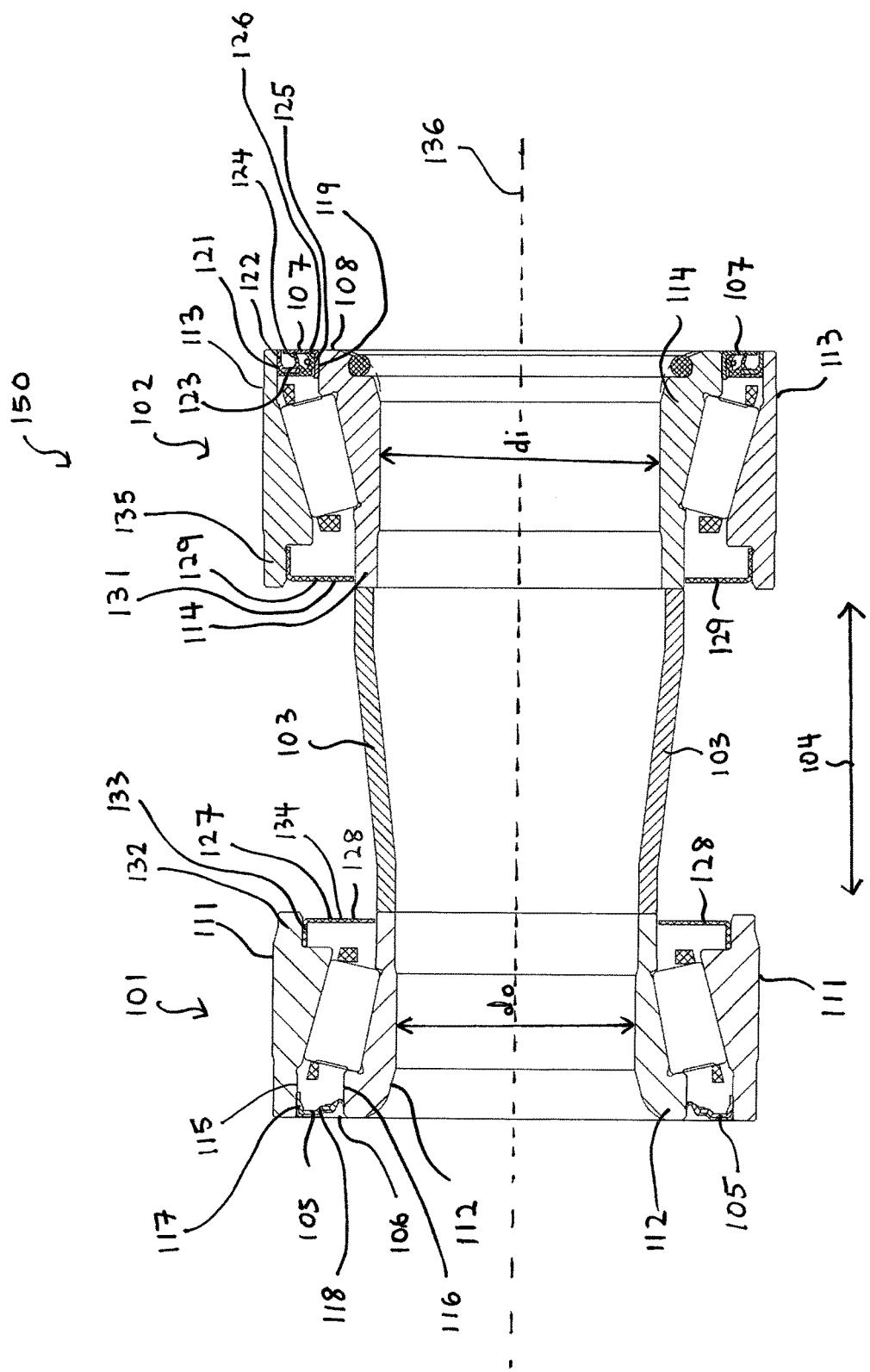
FIG. 1B shows a schematic cross section of a further roller bearing module.

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when a first element is referred to as being "coupled" to a second element, the first element may be connected to or attached to the second element by one or more of the following ways: a) by frictional, static, or hydrophilic forces; and/or b) by press-fitting, form-fitting, sliding-fitting or interlocking whereby a projection or shape of the first element engages with a recess or a complementary form or shape of the second element to prevent, limit or control a relative motion of the first element with respect to the second element or vice versa; and/or c) by using connecting means such as an adhesive or glue, or one or more mechanical joints such as springs, screws, bolts, nuts, clips or rivets for connecting, attaching, or fixing the first element relative to the second element.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1A shows a schematic illustration of a cross section of a roller bearing module 100 for a vehicle hub module.

The roller bearing module 100 comprises an outboard roller bearing 101 and an inboard roller bearing 102. The roller bearing module 100 further comprises a spacer 103 coupling the outboard roller bearing 101 to the inboard roller bearing 102. The spacer 103 is arranged in an axial direction 104 between the outboard roller bearing 101 and the inboard roller bearing 102. The roller bearing module 100 further comprises a first sealing structure 105 arranged at an outwards facing side 106 of the outboard roller bearing 101. The roller bearing module further comprises a second sealing structure 107 arranged at an inwards facing side 108 of the inboard roller bearing 102.

Due to the roller bearing module comprising the first sealing structure 105 and the second sealing structure 107, a lubricant (e.g. grease) may be introduced into the outboard roller bearing 101 and the inboard roller bearing 102 before assembling (or mounting) the roller bearing module with a vehicle hub module. This may allow for the roller bearing module to be pre-assembled with lubricant before assembling it with the vehicle hub module. This may further reduce assembly or manufacturing complexity of forming a vehicle hub assembly, which may otherwise require a part-by-part assembly of the roller bearings with the vehicle hub module, and/or a separate or individual steps (or processes) for the introduction of lubricants into the roller bearings, and/or a separate or individual steps (or processes) for coupling the sealing structures individually to the vehicle hub module.

Due to the first sealing structure 105 being arranged at the outwards facing side 106 of the outboard roller bearing 101, and the second sealing structure 107 being arranged at the inwards facing side 108 of the inboard roller bearing 102, contaminants (e.g. dirt and oil) may be prevented from entering the outboard roller bearing 101 and the inboard roller bearing 102 (e.g. during transportation to the assembly location and/or during the assembly process itself), and lubricants (e.g. grease) may be prevented from leaking out of the outboard roller bearing 101 and the inboard roller bearing 102.

The outboard roller bearing 101 and the inboard roller bearing 102 may each include a cylindrical outer ring (also referred to as an outer ring raceway or cup) and a cylindrical inner ring (also referred to as an inner ring raceway or cone). The outer ring and the inner ring of a roller bearing may be arranged coaxially with respect to a common (or shared or the same) longitudinal axis parallel to the axial direction 104.

Each roller bearing 101, 102 may include a plurality of rolling elements (or rollers) which may be guided by a flange or a cage such that the plurality of rolling elements may roll between the inner ring and the outer ring. For example, the plurality of rolling elements may roll along the inner cylindrical surfaces between the inner ring and the outer ring. The motion of the plurality of rolling elements may be coaxial, and sliding or movement of the plurality of rolling elements in the axial direction 104 or parallel to the common longitudinal axis may be reduced or prevented.

Additionally, or optionally, the outboard roller bearing 101 and the inboard roller bearing 102 may be tapered roller bearings. Alternatively or optionally, the rolling elements may be ball bearings, cylindrical bearings or needle bearings.

The spacer 103 coupling the outboard roller bearing 101 and the inboard roller bearing 102 may have a minimum length of between 5 cm and 200 cm (or e.g. between 10 cm and 150 cm, or e.g. between 50 cm and 100 cm), for example. The spacer 103 may be arranged between the outboard roller bearing 101 and the inboard roller bearing 102. The spacer 103 may maintain or control the axial separation distance between the outboard roller bearing 101 and the inboard roller bearing 102 in the axial direction 104, for example. The spacer 103 (which may include or may be formed from steel or a suitable metal) may be cylindrical and may be arranged between the outboard roller bearing 101 and the inboard roller bearing 102 such that the outboard roller bearing 101, the inboard roller bearing 102 and the spacer 103 are centred around (or share) the same longitudinal axis.

The outboard roller bearing 101 and the inboard roller bearing 102 may thus be separated from each other by a separation distance in the axial direction 104. The minimum separation distance (in an axial direction) between the outboard roller bearing 101 and the inboard roller bearing 102 may lie between 5 cm and 200 cm (or e.g. between 10 cm and 150 cm, or e.g. between 50 cm and 100 cm), for example. The minimum separation distance between the outboard roller bearing 101 and the inboard roller bearing 102 may be the smallest distance measured between the outboard roller bearing 101 and the inboard roller bearing 102 parallel to the common longitudinal axis and/or parallel to the axial direction 104.

The outboard roller bearing 101, the inboard roller bearing 102 and the spacer 103 may each comprise a central receiving portion around the common longitudinal axis for receiving an axle to be assembled with the roller bearing hub. The axle may be assembled such that it is arranged coaxially with respect to the outer ring and the inner ring of the outboard roller bearing 101 and the outer ring and the inner ring of the inboard roller bearing 102 respectively. For example, the axle may be arranged along the common longitudinal axis of the outboard roller bearing 101, the inboard roller bearing 102 and the spacer 103, and may extend in an axial direction 104 along the common longitudinal axis of the outboard roller bearing 101, the inboard roller bearing 102 and the spacer 103.

The outboard (or outer) roller bearing 101 may be located closer towards an end of an axle at which a wheel flange (for holding a wheel) of the vehicle hub module is to be located than the inboard (or inner) roller bearing 102. The inboard roller bearing 102 may be located closer towards a centre portion of the axle.

The first sealing structure 105 and the second sealing structure 107 may each include a sealing ring, for example. The first sealing structure 105 and the second sealing structure 107 may be contact seals for protecting a sealed region of the inboard roller bearing 101 and the outboard roller bearing 102, respectively. The first sealing structure 105 and the second sealing structure 107 may each include respectively an inner portion (e.g. comprising or made from steel or any other suitable material) and an outer portion (e.g. comprising or made from rubber) encasing or enclosing the inner portion. The first sealing structure 105 and the second sealing structure 107 may be respectively press-fitted at the outwards facing side 106 of the outboard roller bearing 101 and at the inwards facing side 108 of the inboard roller bearing 102, respectively.

The outwards facing side 106 of the outboard roller bearing 101 may be a side of the outboard roller bearing 101 facing towards the outside of the roller bearing 100. For example, the outwards facing side 106 of the outboard roller bearing 101 may face outwards of the roller bearing 100. For example, the outwards facing side 106 may be a side of the outboard roller bearing 101 facing away from the inboard roller bearing 102. The inwards facing side of the outboard roller bearing 101 may be a side of the outboard roller bearing 101 facing towards the inboard roller bearing 102 and/or inwards of the roller bearing 100. The inwards facing side of the outboard roller bearing 101 may be a side of the outboard roller bearing 101 closer to the inboard roller bearing 102 than the outwards facing side 106 of the outboard roller bearing 101.

The outwards facing side 107 of the inboard roller bearing 102 may be a side of the inboard roller bearing 102 facing towards the outside of the roller bearing 100. For example, the outwards facing side 107 of the inboard roller bearing 102 may be a side of the inboard roller bearing 102 facing away from the outboard roller bearing 101. The inwards facing side of the inboard roller bearing 102 may be a side of the inboard roller bearing 102 facing towards the outboard roller bearing 101 and/or inwards of the roller bearing 100. The inwards facing side of the inboard roller bearing 102 may be a side of the inboard roller bearing 102 closer to the outboard roller bearing 101 than the outwards facing side 107 of the inboard roller bearing 102.

FIG. 1B shows a schematic illustration of a cross section of a roller bearing module 150 for a vehicle hub module.

The roller bearing module 150 may be similar to the roller bearing module 100 described in connection with FIG. 1A. In addition, aspects and features described in connection with one or more specific examples from FIG. 1A may be combined with one or more of the examples described in connection with FIG. 1B.

The outboard roller bearing 101 may include the cylindrical outer ring 111 and the cylindrical inner ring 112. The outer ring 111 of the outboard roller bearing 101 may be arranged coaxially around the inner ring 112 of the outboard roller bearing 101. For example, the outer ring 111 of the outboard roller bearing 101 and the inner ring 112 of the outboard roller bearing 101 may be arranged coaxially with respect to the central longitudinal axis 136.

Similarly, the inboard roller bearing 102 may include the cylindrical outer ring 113 and the cylindrical inner ring 114. The outer ring 113 of the inboard roller bearing 102 may be arranged coaxially around the inner ring 114 of the inboard roller bearing 102. For example, the outer ring 113 of the inboard roller bearing 102 and the inner ring 114 of the inboard roller bearing 102 may be arranged coaxially with respect to the common longitudinal axis 136.

The first sealing structure 105 may be coupled to an inside cylindrical surface of at least one of an inner ring 112 and an outer ring 111 of the outboard roller bearing 101. For example, the first sealing structure 105 may be coupled to an inside cylindrical surface of at least one of a bearing seal seat of the inner ring 112 (bearing inner ring seal seat) and a bearing seal seat of the outer ring 111 (bearing outer ring seal seat) of the outboard roller bearing (101).

The inside cylindrical surface 116 of the inner ring 112 may face towards the outer ring 111. The inside cylindrical surface of the outer ring 111 may face towards the inner ring 112. For example, an axially extending portion 117 of the first sealing structure 105 may be coupled (e.g. press-fitted or e.g. slide-fitted) to the inside cylindrical surface 115 of the outer ring 111. The first sealing structure 105 may further include a radially extending portion 118 extending from the axially extending portion 117 of the first sealing structure 105 towards (or to) an inside cylindrical surface 116 of the inner ring 112. For example, additionally or optionally, the radially extending portion 118 of the first sealing structure 105 may be coupled to the inside cylindrical surface 116 of the inner ring 112. The first sealing structure 105 may be arranged such that it at least partially (or fully) covers or blocks the spaces between the inner ring 112 and the outer ring 111.

The first sealing structure 105 may prevent dirt, dust, oil, or other contaminants from entering the outboard roller bearing 101. Additionally or optionally, the first sealing structure 105 may prevent the leakage of lubricants (e.g. grease) from the inside of the outboard roller bearing 101 to the outside of the outboard roller bearing 101.

The second sealing structure 107 may be coupled to an inside cylindrical surface of at least one of an inner ring 114 and an outer ring 113 of the inboard roller bearing 102. For example, the second sealing structure 107 may be coupled to an inside cylindrical surface of at least one of a bearing seal seat of an inner ring 114 (bearing inner ring seal seat) and a bearing seal seat of an outer ring 113 (bearing outer ring seal seat) of the inboard roller bearing 102. The inside cylindrical surface 119 of the inner ring 114 may face towards the outer ring 113. The inside cylindrical surface 121 of the outer ring 113 of the inboard roller bearing may face towards the inner ring 114 of the inboard roller bearing.

The second sealing structure 107 may include a sealing element including an axially extending portion 122 coupled to (e.g. press-fitted or slide-fitted) the inside cylindrical surface 121 of the outer ring 113. The sealing element of the second sealing structure 107 may further include a radially extending portion 123 extending from the axially extending portion 122 of the second sealing structure 107 towards the inner ring 114. The sealing element of the second sealing structure 107 may further include at least one or more seal lip portions 124 (e.g. one or two or more seal lips) extending axially from the radially extending portion 123 of the sealing element. The one or more seal lip portions 124 may face outwards of the inboard roller bearing 102, for example. The second sealing structure 107 may further include a shielding element which may include an axially extending portion 125 coupled (e.g. press-fitted or slide-fitted) to the inside cylindrical surface 119 of the inner ring 114. The shielding element of the second sealing structure 107 may further include a radially extending portion 126 extending from the axially extending portion 125 of the shielding element towards the outer ring 113. The axially extending seal lip portion 124 may extend between the radially extending portion 123 of the sealing element and the radially extending portion 126 of the shielding element.

The second sealing structure 107 may prevent dirt, dust, oil, or other contaminants from entering the inboard roller bearing 102. Additionally or optionally, the second sealing structure 107 may prevent the leakage of lubricants (e.g. grease) from the inside of the inboard roller bearing 102 to the outside of the inboard roller bearing 102.

Optionally, the first sealing structure 105 and the second sealing structure 107 (instead of having different features or structures as described), may instead be similar or identical. For example, optionally, the second sealing structure 107 may adopt (or have) the same features as the first sealing structure 105 described herein. Alternatively, the first sealing structure 105 may adopt (or have) the same features as the second sealing structure 107 described herein.

The spacer 103 may be arranged such that it couples the inner ring 112 of the outboard roller bearing 101 to the inner ring 114 of the inboard roller bearing 102. For example, the spacer 103 may be directly connected to (e.g. via adhesive means and/or mechanical joints, or e.g. via pressure fitting or form-fitting) the inboard roller bearing 102 and the outboard roller bearing 101. Alternatively or optionally, the spacer 103 may be free-floating, whereby a first distal end of the spacer 103 may be non-permanently fixed to the inboard roller bearing 102 and/or a second distal end of the spacer 103 may be non-permanently fixed to the outboard roller bearing 101, respectively. In this regard, the spacer 103 may still be considered to be coupled to the outboard roller bearing 101 and the inboard roller bearing 102 as the spacer 103 may have transient (e.g. non-permanent or transitory) contact with the outboard roller bearing 101 and the inboard roller bearing 102. Furthermore, the minimum separation distance between the outboard roller bearing 101 and the inboard roller bearing 102 may be at least partially controlled by (or dependent) on the length of the spacer 103 in the axial (or longitudinal) direction.

Due to the spacer 103 keeping the outboard roller bearing 101 and the inboard roller bearing 102 spatially separated by the minimum separation distance, the outboard roller bearing 101 does not need to be the same size as the inboard roller bearing 102. The outboard roller bearing 101 may be smaller than the inboard roller bearing 102, for example. Furthermore, the spacer 103 may allow the outboard roller bearing 101 and the inboard roller bearing 102 to be kept apart by long distances, compared to roller bearing modules without the spacer.

A diameter of the outer (and/or inner) ring 111 of the outboard roller bearing 101 may be smaller than a diameter of an outer (and/or inner) ring of the inboard roller bearing 102. For example, diameter, do, (or circumference) of the outboard roller bearing 101 may be smaller than a diameter, di, (or circumference) of the inboard roller bearing 102. The diameter of the outer ring of the inboard roller bearing 102 may lie between 70 cm and 200 cm. The diameter of the outer ring of the outboard roller bearing 101 may lie between 10% and 75% (or e.g. between 20% and 60%, or e.g. between 30% and 50%) of the diameter of the outer ring of the inboard roller bearing 102.

Due to the outboard roller bearing 101 being smaller than the inboard roller bearing 102, smaller and/or fewer bearings may be used, and thus the cost of the bearings and overall wheel cost may be reduced. This cost reduction may be larger than if rollers from the outer row roller bearing are removed without reducing the size of the outboard roller bearing 101 as not so many roller bearings may be removed. Furthermore, the loading rate of the outboard roller bearing 101 may be improved.

In order to improve coupling between the spacer 103 and the outboard roller bearing 101 and the inboard roller bearing 102, the spacer 103 may have a smaller diameter portion closer towards the outboard roller bearing 101 and a larger diameter portion closer towards the inboard roller bearing 102. For example, a diameter of the smaller diameter portion may lie between 10% and 75% (or e.g. between 20% and 60%, or e.g. between 30% and 50%) of the diameter of the larger diameter portion of the spacer 103.

The roller bearing module 150 may further include a first shielding structure 127 arranged at an inwards facing side 128 of the outboard roller bearing 101. The roller bearing module 150 may further include a second shielding structure 129 arranged at an outwards facing side 131 of the inboard roller bearing 102. The first shielding structure 127 and the second shielding structure 129 may each be arranged between the inner rings and the outer rings of the outboard roller bearing 101 and the inboard roller bearing 102 respectively, to cover or block the spaces between the inner rings and the outer rings. For example, the first shielding structure 127 and the second shielding structure 129 may each be circular (or cylindrical) structures for blocking the circular spaces between the inner rings and the outer rings. The first shielding structure 127 and the second shielding structure 129 may prevent contaminants (e.g. dirt, particles and/or oil) from entering the outboard roller bearing 101 and the inboard roller bearing 102 respectively, and for keeping lubricants (e.g. grease) in the outboard roller bearing 101 and the inboard roller bearing 102, respectively.

The first shielding structure 127 may be coupled (e.g. press-fitted or slide-fitted) to the inside cylindrical surface 116 (or, alternatively, to the outside cylindrical surface) of the inner ring 112 of the outboard roller bearing 101 and/or to the inside cylindrical surface 115 of the outer ring 111 of the outboard roller bearing 101. For example, the first shielding structure 127 may be coupled to an inside cylindrical surface 116 (or, alternatively, to the outside cylindrical surface) of a bearing shield seat of an inner ring 112 (bearing inner ring shield seat) of the outboard roller bearing 101 and to an inside cylindrical surface 115 of a bearing shield seat of an outer ring 111 (bearing outer ring shield seat) of the outboard roller bearing 101.

The outer ring 111 (and/or the inner ring 112) of the outboard roller bearing 101 may include an axially extending protrusion 132 for engaging an axially extending portion 133 of the first shielding structure 127. The axially extending protrusion 132 of the outer ring 111 may be located at the inwards facing side 128 of the outboard roller bearing 101 and may protrude or extend in an inwards direction of the roller bearing module 150. The inside cylindrical surface of the axially extending protrusion 132 of the outer ring 111 of the outboard roller bearing 101 may be connected to (or may engage) the axially extending portion 133 of the first shielding structure 127.

The first shielding structure 127 may further include a radially extending portion 134 extending from the axially extending portion 133 towards the inner ring 112. A distal end of the radially extending portion 134 of the first shielding structure 127 may be connected to (or may engage) the inside cylindrical surface 116 of the inner ring 112 of the outboard roller bearing 101.

The second shielding structure 129 may be coupled (e.g. press-fitted or slide-fitted) to the inside cylindrical surface 119 (or, alternatively, to the outside cylindrical surface) of the inner ring 114 of the inboard roller bearing 102 and/or to the inside cylindrical surface 121 of the outer ring 113 of the inboard roller bearing 102. For example, the second shielding structure 129 may be coupled to an inside cylindrical surface 119 (or, alternatively, to the outside cylindrical surface) of a bearing shield seat of the inner ring 114 (e.g. a bearing inner ring shield seat) of the inboard roller bearing 102 and to an inside cylindrical surface 121 of a bearing shield seat of the outer ring 113 (e.g. a bearing outer ring shield seat) of the inboard roller bearing 102.

The second shielding structure 129 may be similar or identical to the first shielding structure 127. For example, the outer ring 113 (and/or the inner ring 114) of the inboard roller bearing 102 may include an axially extending protrusion 135 for engaging an axially extending portion of the second shielding structure 129. Additionally, a distal end of a radially extending portion of the second shielding structure 129 may be connected to (or may engage) the inside cylindrical surface 119 of the inner ring 114 of the inboard roller bearing 102.

More details and aspects are mentioned in connection with the embodiments described above or below. The embodiments shown in FIG. 1B may comprise one or more optional additional features corresponding to one or more aspects mentioned in connection with the proposed concept or one or more embodiments described above (e.g. FIG. 1A) or below (e.g. FIGS. 2A to 4D).

Figure 2A:
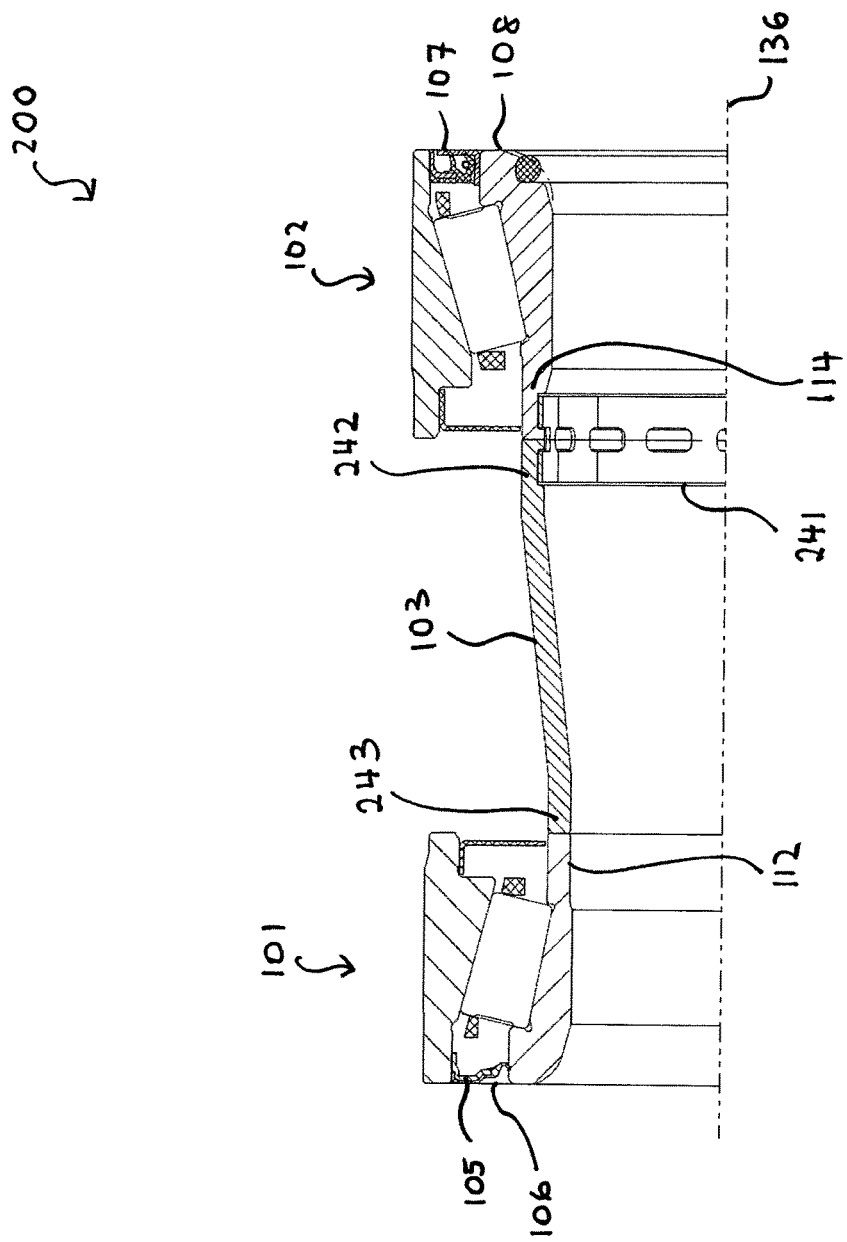
FIG. 2A shows a schematic cross section of a further roller bearing module having a clipping device.

FIG. 2A shows a schematic illustration of a cross section of a roller bearing module 200 for a vehicle hub module.

The roller bearing module 200 may be similar to the roller bearing modules described in connection with FIGS. 1A and 1B. In addition, aspects and features described in connection with one or more specific examples from FIGS. 1A and 1B may be combined with one or more of the examples described in connection with FIG. 2A.

The roller bearing module 200 may further include at least one clipping device configured to connect (or attach) the spacer 103 to at least one of the inboard roller bearing 102 and the outboard roller bearing 101. For example, a clipping device may be configured to connect (or attach) the first distal end 242 of the spacer 103 to the inner ring 114 of the inboard roller bearing 102. The second distal end 243 of the spacer 103 may be press-fitted to contact or connect to the inner ring 112 of the outboard roller bearing 101. Alternatively or optionally, the second distal end of the spacer 103 may be free-floating, or not permanently fixed to the outboard roller bearing 101.

Alternatively, or optionally, the clipping device 241 may be configured to connect (or attach) the second distal end 243 of the spacer 103 to the inner ring 112 of the outboard roller bearing 101. The first distal end of the space 103 may be press-fitted to contact or connect to the inner ring 114 of the inboard roller bearing 102. Alternatively or optionally, the first distal end of the spacer 103 may be free-floating, or not permanently fixed to the inboard roller bearing 101.

More details and aspects are mentioned in connection with the embodiments described above or below. The embodiments shown in FIG. 2A may comprise one or more optional additional features corresponding to one or more aspects mentioned in connection with the proposed concept or one or more embodiments described above (e.g. FIGS. 1A to 1B) or below (e.g. FIGS. 2B to 4D).

Figure 2B:
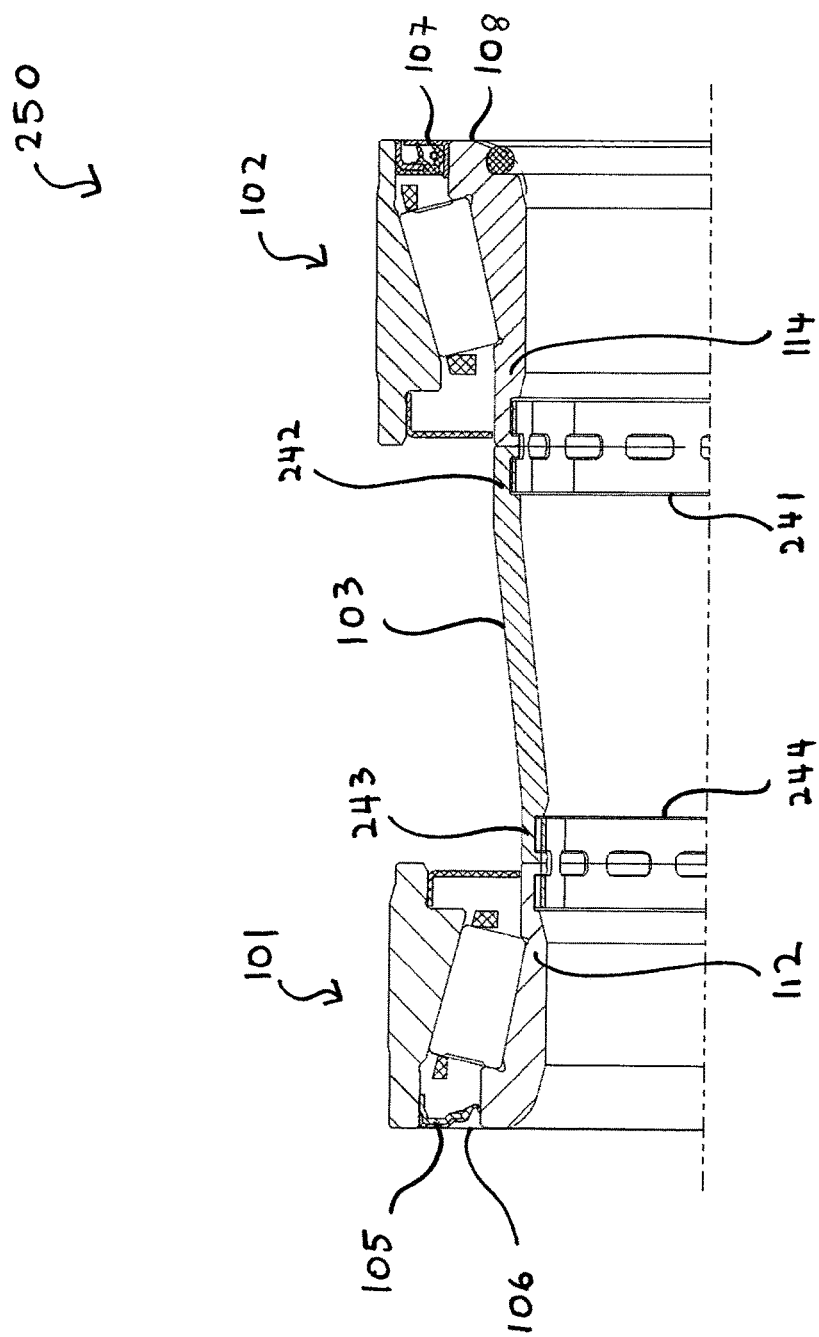
FIG. 2B shows a schematic cross section of a further roller bearing module having a first clipping device and a second clipping device.

FIG. 2B shows a schematic illustration of a cross section of a roller bearing module 250 for a vehicle hub module.

The roller bearing module 250 may be similar to the roller bearing modules described in connection with FIGS. 1A to 2A. In addition, aspects and features described in connection with one or more specific examples from FIG. 1A to 2A may be combined with one or more of the examples described in connection with FIG. 2B.

The roller bearing module 250 may include at least one (or e.g. more than one) clipping device. For example, the roller bearing module 250 may include a first clipping device 241 configured to connect the spacer 103 to the inner ring 114 of the inboard roller bearing 102. The roller bearing module 250 may further include a second clipping device 244 configured to connect the spacer 103 to the inner ring 112 of the outboard roller bearing 101.

More details and aspects are mentioned in connection with the embodiments described above or below. The embodiments shown in FIG. 2B may comprise one or more optional additional features corresponding to one or more aspects mentioned in connection with the proposed concept or one or more embodiments described above (e.g. FIG. 1A to 2A) or below (e.g. FIGS. 3 to 4D).

Figure 3:
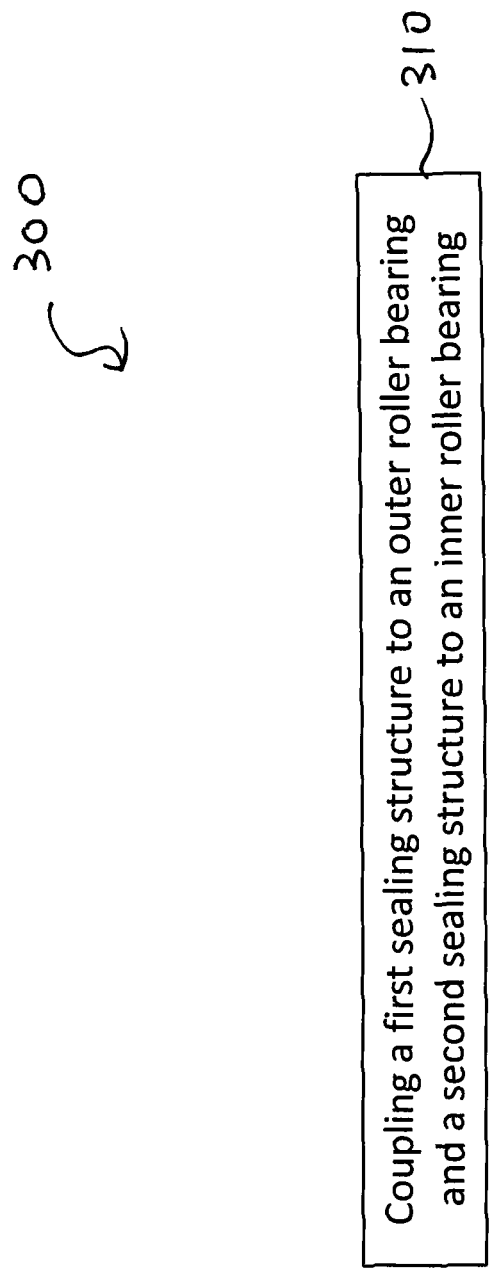
FIG. 3 shows a flow chart of a method for manufacturing a roller bearing module.

FIG. 3 shows a flow chart of a method 300 for manufacturing a roller bearing module.

The method 300 comprises coupling 310 a first sealing structure to an outboard roller bearing and a second sealing structure to an inboard roller bearing to form a roller bearing module.

Due to the coupling of the first sealing structure to the outboard roller bearing and the coupling of the second sealing structure to the inboard roller bearing, a roller bearing module already carrying lubricant (or grease) may be formed or pre-assembled before assembling the roller bearing module with a vehicle hub module. The method may further reduce assembly or manufacturing complexity of forming the vehicle hub assembly, which may otherwise require a part-by-part assembly of the roller bearings with the vehicle hub module and/or a separate or individual step (or process) for the introduction of lubricants into the roller bearings during the part-by-part assembly of the roller bearings with the vehicle hub module.

The first sealing structure may be similar to the first sealing structure described in connection with FIGS. 1A to 2B. The second sealing structure may be similar to the second sealing structure described in connection with FIGS. 1A to 2B. The roller bearing module formed by the method 300 may include one or more (or all) of the features described in connection with FIGS. 1A to 2B.

The coupling of the first sealing structure to the outboard roller bearing and the coupling of the second sealing structure to the inboard roller bearing may be carried out by press-fitting or form-fitting, for example.

More details and aspects are mentioned in connection with the embodiments described above or below. The embodiments shown in FIG. 3 may comprise one or more optional additional features corresponding to one or more aspects mentioned in connection with the proposed concept or one or more embodiments described above (e.g. FIG. 1A to 2B) or below (e.g. FIGS. 4A to 4D).

Figure 4A:
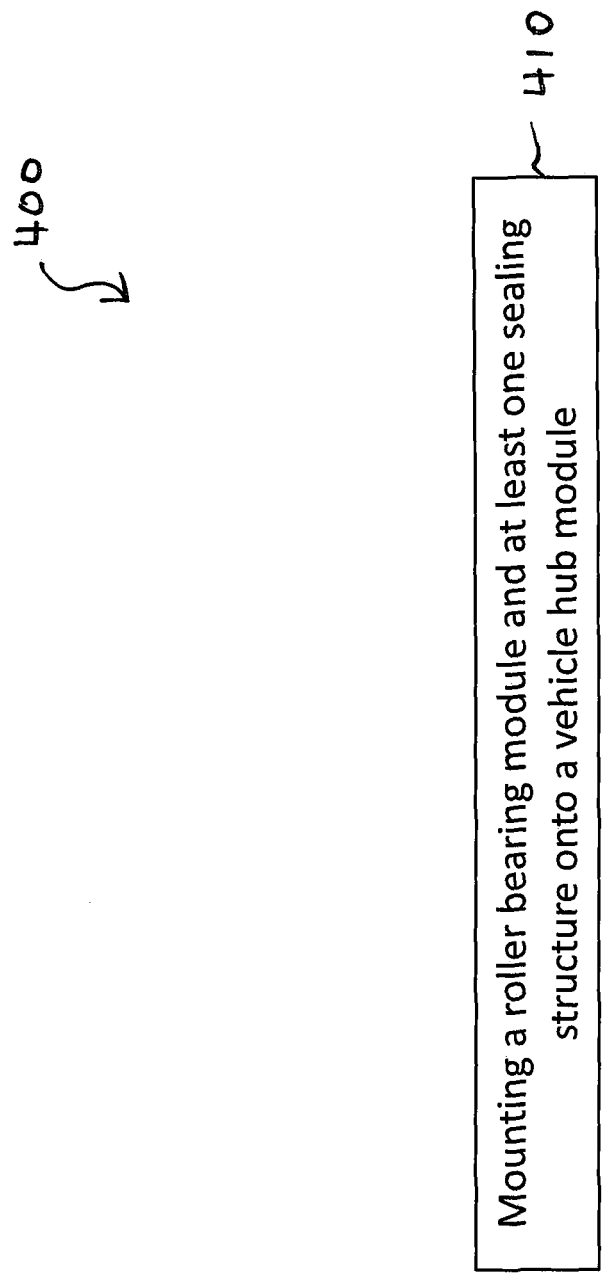
FIG. 4A shows a flow chart of a method for forming a vehicle hub assembly.

FIG. 4A shows a flow chart of a method 400 for forming a vehicle hub assembly.

The method 400 comprises mounting 410 a roller bearing module and at least one sealing structure of the roller bearing module onto a vehicle hub module in a single mounting step.

Due to the mounting of the roller bearing module and the at least one sealing structure of the roller bearing module onto the vehicle hub module in a single mounting step, manufacturing complexity of forming the vehicle hub assembly may be reduced. A need for assembling the roller bearing module and the at least one sealing structure in separate individual steps may be avoided, for example.

The roller bearing module mentioned in connection with FIG. 4 may be similar to the roller bearing module described in connections with FIGS. 1A to 3. The at least one sealing structure of the roller bearing module may refer to (or may be) the first sealing structure and/or the second sealing structure described in connection with FIGS. 1A to 3.

The roller bearing module including the at least one sealing structure may be mounted (e.g. by pressing or fitting) onto the vehicle hub module in a single (e.g. one) mounting step. For example, the roller bearing module including the at least one sealing structure (e.g. the first sealing structure and the second sealing structure) which may already be pre-assembled to be part of the roller bearing module, may be assembled or mounted as a single unit onto the vehicle hub module. Thus, the roller bearing module and the at least one sealing structure are mounted or assembled onto the vehicle hub module simultaneously or at the same time.

More details and aspects are mentioned in connection with the embodiments described above or below. The embodiments shown in FIG. 4A may comprise one or more optional additional features corresponding to one or more aspects mentioned in connection with the proposed concept or one or more embodiments described above (e.g. FIG. 1A to 3) or below (e.g. FIGS. 4B to 4D).

FIG. 4B shows a schematic illustration of a cross section of a vehicle hub assembly 450.

The vehicle hub assembly 450 may be formed by the mounting (or pressing or fitting) of the a roller bearing module 100, 150 and at least one sealing structure 105, 107 of the roller bearing module 100, 150 onto a vehicle hub module 251 in a single mounting step described in connection with FIG. 4A.

The vehicle hub module 251 may include a cylindrical (or tubular) body portion 252, which may be configured to receive (or to be coupled) to the roller bearing module 100, 150. The cylindrical body portion 252 of the vehicle hub module 251 may extend axially in an axial direction 104. The inner circumferential surface of the body portion 252 may define a central space for receiving the roller bearing module 100, 150. For example, the roller bearing module 100,150 may be press-fitted (or form-fitted) to the body portion 252 of the vehicle hub module 251.

The vehicle hub module 251 may further include a circular flange portion 253 extending radially from the body portion 252 of the vehicle hub module 251. A wheel may be coupled to the circular flange portion 253 via a plurality of mechanical joints (e.g. nuts and bolts).

More details and aspects are mentioned in connection with the embodiments described above or below. The embodiments shown in FIG. 4B may comprise one or more optional additional features corresponding to one or more aspects mentioned in connection with the proposed concept or one or more embodiments described above (e.g. FIG. 1A to 4A) or below (e.g. FIGS. 4C to 4D).

FIG. 4C shows a schematic illustration of a cross section of a vehicle hub assembly 460.

The vehicle hub assembly 460 may be similar to the vehicle hub assembly described in connection with FIG. 4B. Furthermore, the roller bearing module 200 mounted onto the vehicle hub module 251 may include a clipping device 241 configured to connect (or attach) a distal end of the spacer 103 to an inner ring of a roller bearing as described in connection with FIG. 2A.

More details and aspects are mentioned in connection with the embodiments described above or below. The embodiments shown in FIG. 4C may comprise one or more optional additional features corresponding to one or more aspects mentioned in connection with the proposed concept or one or more embodiments described above (e.g. FIG. 1A to 4B) or below (e.g. FIG. 4D).

Figure 4D:
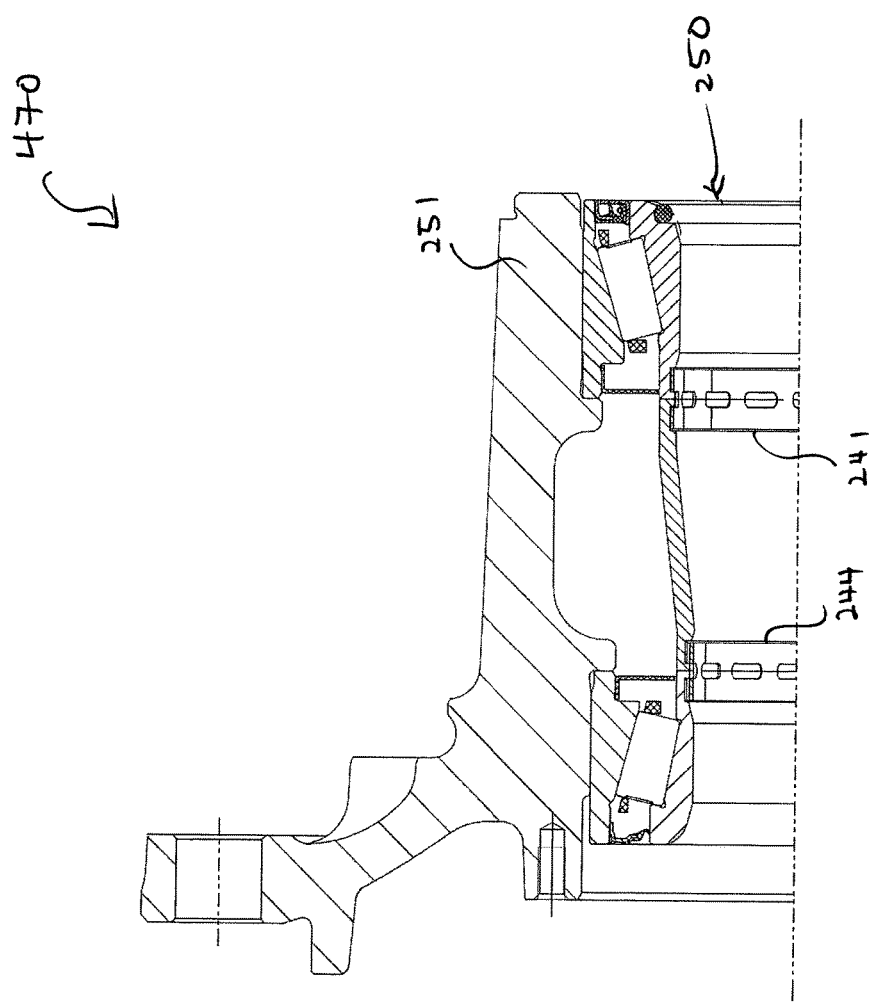
FIG. 4D shows a schematic cross section of a vehicle hub assembly in which a roller bearing module having a first clipping device and a second clipping device is mounted onto a vehicle hub module.

FIG. 4D shows a schematic illustration of a cross section of a vehicle hub assembly 470.

The vehicle hub assembly 470 may be similar to the vehicle hub assembly described in connection with FIG. 4B. Furthermore, the roller bearing module 250 mounted onto the vehicle hub module 251 may include a first clipping device 241 configured to connect the spacer 103 to the inner ring of the inboard roller bearing 102 and a second clipping device 244 configured to connect the spacer 103 to the inner ring of the outboard roller bearing 101 as described in connection with FIG. 2B.

More details and aspects are mentioned in connection with the embodiments described above or below. The embodiments shown in FIG. 4D may comprise one or more optional additional features corresponding to one or more aspects mentioned in connection with the proposed concept or one or more embodiments described above (e.g. FIG. 1A to 4C) or below.

The various embodiments and examples relate to a truck hub module, a truck wheel end bearing unit and a cost-efficient bearing design to take (or carry) truck wheel end load. The various embodiments and examples relate to a vehicle (or truck) hub module which may include a specially designed tapered roller bearing with an extended inner ring and (a smaller) outer ring, which may be integrated with at least one seal, at least one shield and grease as a module. The end-user may be provided with a different module for the inboard (inner) roller bearing and the outboard (outer) roller bearing. Between the two rows of roller bearings, the roller bearings may be connected by a spacer through inner rings in order to keep a distance between the roller bearings. A smaller module may be selected for the outboard row of roller bearings, which may save wheel end costs (and/or overall manufacturing costs for the end user).

Due to the loading rate of both the outer row roller bearing and the inner row roller bearing being fully used, the performance (of the vehicle hub module) may be at least equal to or better than conventional truck hub units. The same (or equal) or improved preloading effects may be attained compared with conventional truck hub units. Due to the roller bearing module being a closed bearing system, it is more reliable (e.g. as contaminants may be prevented from entering the roller bearing). The roller bearing module may be produced on normal tapered roller bearing (mTRB) channels, and thus less additional investment may be required. It may also be easy to upgrade from conventional TRB wheel end solutions to the roller bearing modules described herein.

Aspects and features (e.g. the roller bearing, the vehicle hub module, the outboard roller bearing, the inboard roller bearing, the first sealing structure, the second sealing structure, the first shielding structure, the second shielding structure, the at least one clipping device, the inner rings and the outer rings, and the spacer) mentioned in connection with one or more specific examples may be combined with one or more of the other examples.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The invention claimed is:

1. A roller bearing module for a vehicle hub module, the roller bearing module comprising:
   an outboard roller bearing;
   an inboard roller bearing;
   a spacer coupling the outboard roller bearing to the inboard roller bearing, the spacer arranged in an axial direction between the outboard roller bearing and the inboard roller bearing, the spacer having a first distal end and a second distal end, the second distal end is connected to an inner ring of the outboard roller bearing and the first distal end is axially aligned with, adjacent to, free-floating relative to, and not permanently affixed to an inner ring of the inboard roller bearing;
   a first sealing structure arranged at an outwards facing side of the outboard roller bearing, and
   a second sealing structure arranged at an inwards facing side of the inboard roller bearing.

2. The roller bearing module according to claim 1, wherein the first sealing structure is coupled to an inside cylindrical surface of at least one of the inner ring and an outer ring of the outboard roller bearing, and/or wherein the second sealing structure is coupled to an inside cylindrical surface of at least one of the inner ring and an outer ring of the inboard roller bearing.

3. The roller bearing module according to claim 1, wherein the first sealing structure is coupled to an inside cylindrical surface of at least one of a bearing seal seat of the inner ring and a bearing seal seat of an outer ring of the outboard roller bearing, and/or wherein the second sealing structure is coupled to an inside cylindrical surface of at least one of a bearing seal seat of the inner ring and a bearing seal seat of an outer ring of the inboard roller bearing.

4. The roller bearing module according to claim 3, wherein the spacer has a first diameter proximate to the outboard roller bearing and a second diameter proximate to the inboard roller bearing, the first diameter being less than the second diameter, the spacer having a constant cross sectional thickness.

5. The roller bearing module according to claim 3, wherein at least one of the inner ring and the outer ring of the outboard roller bearing comprises an axially extending protrusion for engaging an axially extending portion of the first shielding structure.

6. The roller bearing module according to claim 1, wherein the spacer has a first diameter proximate to the outboard roller bearing and a second diameter proximate to the inboard roller bearing, the first diameter being less than the second diameter, the spacer having a constant cross sectional thickness.

7. The roller bearing module according to claim 6, wherein the first shielding structure is coupled to an inside cylindrical surface of a bearing shield seat of an outer ring of the outboard roller bearing, and/or wherein the second shielding structure is coupled to an inside cylindrical surface of a bearing shield seat of the inner ring of the inboard roller bearing.

8. The roller bearing module according to claim 1, further comprising at least one clipping device configured to couple the spacer to at least one of the inboard roller bearing and the outboard roller bearing.

9. A method for manufacturing a roller bearing module, the method comprising:

coupling a first sealing structure to an outboard roller bearing; and
coupling a second sealing structure to an inboard roller bearing to form the roller bearing module having;
an outboard roller bearing;
an inboard roller bearing;
a spacer coupling the outboard roller bearing to the inboard roller bearing, the spacer arranged in an axial direction between the outboard roller bearing and the inboard roller bearing the spacer having a first distal end and a second distal end, the second distal end is connected to an inner ring of the outboard roller bearing and the first distal end is axially aligned with, adjacent to, free-floating relative to, and not permanently affixed to an inner ring of the inboard roller bearing;
a first sealing structure arranged at an outwards facing side of the outboard roller bearing, and a second sealing structure arranged at an inwards facing side of the inboard roller bearing.

10. A method for forming a vehicle hub assembly, the method comprising:
mounting the roller bearing module having;
an outboard roller bearing;
an inboard roller bearing;
a spacer coupling the outboard roller bearing to the inboard roller bearing, the spacer arranged in an axial direction between the outboard roller bearing and the inboard roller bearing, the spacer having a first distal end and a second distal end, the second distal end is connected to an inner ring of the outboard roller bearing and the first distal end is axially aligned with, adjacent to, free-floating relative to, and not permanently affixed to an inner ring of the inboard roller bearing;
a first sealing structure arranged at an outwards facing side of the outboard roller bearing, and
a second sealing structure arranged at an inwards facing side of the inboard roller bearing, and
at least one sealing structure of the roller bearing module onto a vehicle hub module in a single mounting step.

* * * * *